(12) United States Patent
Shimada (10) Patent No.: US 10,566,585 B2
(45) Date of Patent: Feb. 18, 2020

(54) BATTERY PACK

(71) Applicant: TOYOTA JIDOSHA KABUSHIKI KAISHA, Toyota-shi, Aichi-ken (JP)

(72) Inventor: Masaki Shimada, Kariya (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 175 days.

(21) Appl. No.: 15/805,960

(22) Filed: Nov. 7, 2017

(65) Prior Publication Data

US 2018/0138471 A1    May 17, 2018

(30) Foreign Application Priority Data

Nov. 15, 2016 (JP) .................................. 2016-222638

(51) Int. Cl.
*H01M 2/10* (2006.01)
(52) U.S. Cl.
CPC ....... *H01M 2/1005* (2013.01); *H01M 2/1077* (2013.01); *H01M 2220/20* (2013.01)
(58) Field of Classification Search
CPC ............. H01M 2/1005; H01M 2/1077; H01M 2220/20
See application file for complete search history.

(56) References Cited

U.S. PATENT DOCUMENTS

| | | | | |
|---|---|---|---|---|
| 2014/0093765 | A1* | 4/2014 | Kusunoki | ........... H01M 2/1072 429/120 |
| 2015/0255764 | A1 | 9/2015 | Loo et al. | |
| 2015/0280190 | A1* | 10/2015 | Ohshiba | .............. H01M 2/1094 429/53 |
| 2016/0248059 | A1* | 8/2016 | Katayama | ........... H01M 2/1083 |
| 2017/0288186 | A1* | 10/2017 | Kruger | .................... H01M 2/12 |

FOREIGN PATENT DOCUMENTS

| | | |
|---|---|---|
| JP | 7-34551 U | 6/1995 |
| JP | 2004-58697 A | 2/2004 |
| JP | 2012-128984 A | 7/2012 |
| JP | 2014-013661 A | 1/2014 |
| JP | 2014-029797 A | 2/2014 |
| JP | 2015-170452 A | 9/2015 |

* cited by examiner

*Primary Examiner* — Gregg Cantelmo
(74) *Attorney, Agent, or Firm* — Sughrue Mion, PLLC (57) ABSTRACT

A battery pack has a battery unit and a battery case. The battery case includes side frames and an upper frame. The upper frame includes an upper surface portion and a trailing portion that extends downward from an end portion of the upper surface portion. Each of the side frames includes a side surface portion, an intermediate portion that extends from an upper end of the side surface portion inward in the width direction so as to pass below the upper surface portion and faces the upper surface portion in an up-down direction, and a contact portion that extends upward from an end portion of the intermediate portion and is brought into contact with the upper surface portion. The trailing portion includes one or more access openings that are accessible to a space between the upper surface portion and the intermediate portion facing each other in the up-down direction.

6 Claims, 6 Drawing Sheets

PRIOR ART

FIG. 8

PRIOR ART

BATTERY PACK

INCORPORATION BY REFERENCE

The disclosure of Japanese Patent Application No. 2016-222638 filed on Nov. 15, 2016 including the specification, drawings and abstract is incorporated herein by reference in its entirety.

BACKGROUND

1. Technical Field

The present disclosure relates to a battery pack which has a battery unit and a battery case that houses the battery unit, and is mounted in a vehicle.

2. Description of Related Art

In an electrically powered vehicle, for example, a hybrid vehicle or an electric vehicle, a battery pack that supplies electric power to a motor for traveling is mounted. Such a battery pack has a configuration in which a battery unit with a plurality of single cells, a voltage sensor, and the like combined in a unit is housed in a battery case. The battery pack is assembled outside the vehicle, transported to a designated location of the vehicle, and mounted. When no holding portion or handle is provided in the battery pack, in a case of transporting the battery pack, the battery pack has to be lifted up from the bottom, and transportability is bad.

SUMMARY

Japanese Unexamined Patent Application Publication No. 2014-013661 (JP 2014-013661 A) discloses that a handle projecting outward is provided on a side surface of a case of a battery pack. A worker holds the handle and transports the case. However, in a case where the handle projecting outward from the side surface of the case is provided as disclosed in JP 2014-013661 A, the entire battery pack increases in size. In the vehicle, since a mounting space is limited, an increase in size of the in-vehicle battery pack causes a serious problem.

The handle disclosed in JP 2014-013661 A is merely used when the worker manually transports the single case before being assembled as the battery pack. In other words, in the related art, providing a holding portion for lifting up and transporting the entire assembled battery pack in the battery pack is not considered. As a result, in the battery pack of the related art, transportability is bad.

Accordingly, the present disclosure provides a battery pack that is easy to transport and suppresses an increase in size.

An aspect of the present disclosure relates to a battery pack that includes a battery unit and a battery case that houses the battery unit, and is configured to be mounted in a vehicle. The battery case includes side frames and an upper frame. The side frames and the upper frame are prepared separately from one another and are bonded together. The upper frame includes an upper surface portion that covers an upper surface of the battery unit and a trailing portion that extends downward from an end portion in a width direction of the upper surface portion. Each of the side frames includes a side surface portion that covers a side surface of the battery unit, an intermediate portion that extends from an upper end of the side surface portion inward in the width direction so as to pass below the upper surface portion and faces the upper surface portion in an up-down direction, and a contact portion that extends upward from an end portion of the intermediate portion and is brought into contact with the upper surface portion. The trailing portion includes one or more access openings that are accessible to a space between the upper surface portion and the intermediate portion facing each other in the up-down direction.

According to the aspect of the present disclosure, the access openings are included in the trailing portion of the upper frame, whereby it is possible to suspend and hold the battery pack by hooking a part of a handle or a transport device on the upper surface portion, and to improve transportability of the battery pack. Furthermore, since the access openings are merely included in the trailing portion, and a dedicated member that projects outward in the width direction is not provided in order to suspend and hold the battery pack, it is possible to suppress an increase in size of the battery pack. In addition, since the contact portion of each of the side frames is brought into contact with the upper surface portion of the upper frame, even if the access openings are formed in the upper frame, entrance of a foreign substance or water into the battery pack is prevented.

In the battery pack according to the aspect of the present disclosure, the access opening may be a notched portion that is notched from a lower end of the trailing portion to the middle of the upper surface portion.

According to the aspect of the present disclosure, the access openings extend to the middle of the upper surface portion, whereby a contact area of a holding hook of the transport device and the upper frame increases, making it possible to more stably transport the battery pack.

In the battery pack according to the aspect of the present disclosure, the upper frame may have a pair of trailing portions that extend downward from both ends in the width direction of the upper surface portion and face each other in the width direction, and the side frames may be disposed on both sides in a width direction of the battery unit. Each trailing portion may include two access openings.

According to the aspect of the present disclosure, four access openings in total with two access openings on each side in the width direction of the battery pack are included, whereby it is possible to distribute a holding position, and to more stably transport the battery pack.

In the battery pack according to the aspect of the present disclosure, a vicinity of a lower end of the trailing portion may be brought into contact with a vicinity of an upper end of the side surface portion. The upper surface portion of the upper frame and the contact portion of each of the side frames may be bonded to each other. The trailing portion of the upper frame and the side surface portion of each of the side frames may be bonded to each other.

According to the aspect of the present disclosure, the upper surface portion and the contact portion are bonded to each other, whereby it is possible to more reliably eliminate the gap between both portions, and to more reliably prevent entrance of water or a foreign substance from the gap between both portions into the battery pack. Furthermore, the trailing portion and the side surface portion are bonded to each other as well as the upper surface portion and the contact portion, whereby it is possible to distribute force applied to a bonded portion at the time of suspending and holding, and to more effectively prevent separation of the upper frame and the side frames.

In the battery pack according to the aspect of the present disclosure, a plate thickness of each of the side frames and a plate thickness of the upper frame may be different from each other.

According to the aspect of the present disclosure, the plate thicknesses of the side frames and the upper frame are changed depending on requested strength or the like, whereby it is possible to further reduce the materials for the side frames and the upper frame while maintaining needed strength. Consequently, it is possible to further reduce the weight and cost of the battery pack.

According to the aspect of the present disclosure, since the access openings are included in the trailing portion of the upper frame, it is possible to suspend and hold the battery pack by hooking a part of the handle or the transport device on the upper surface portion, and to improve transportability of the battery pack. Furthermore, since the access openings are merely included in the trailing portion, and a dedicated member projecting outward in the width direction is not provided in order to suspend and hold the battery pack, it is possible to suppress an increase in size of the battery pack. In addition, since the contact portion of each of the side frames is brought into contact with the upper surface portion of the upper frame, even if the access openings are included in the upper frame, entrance of a foreign substance or water into the battery pack is prevented.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Figure 1:
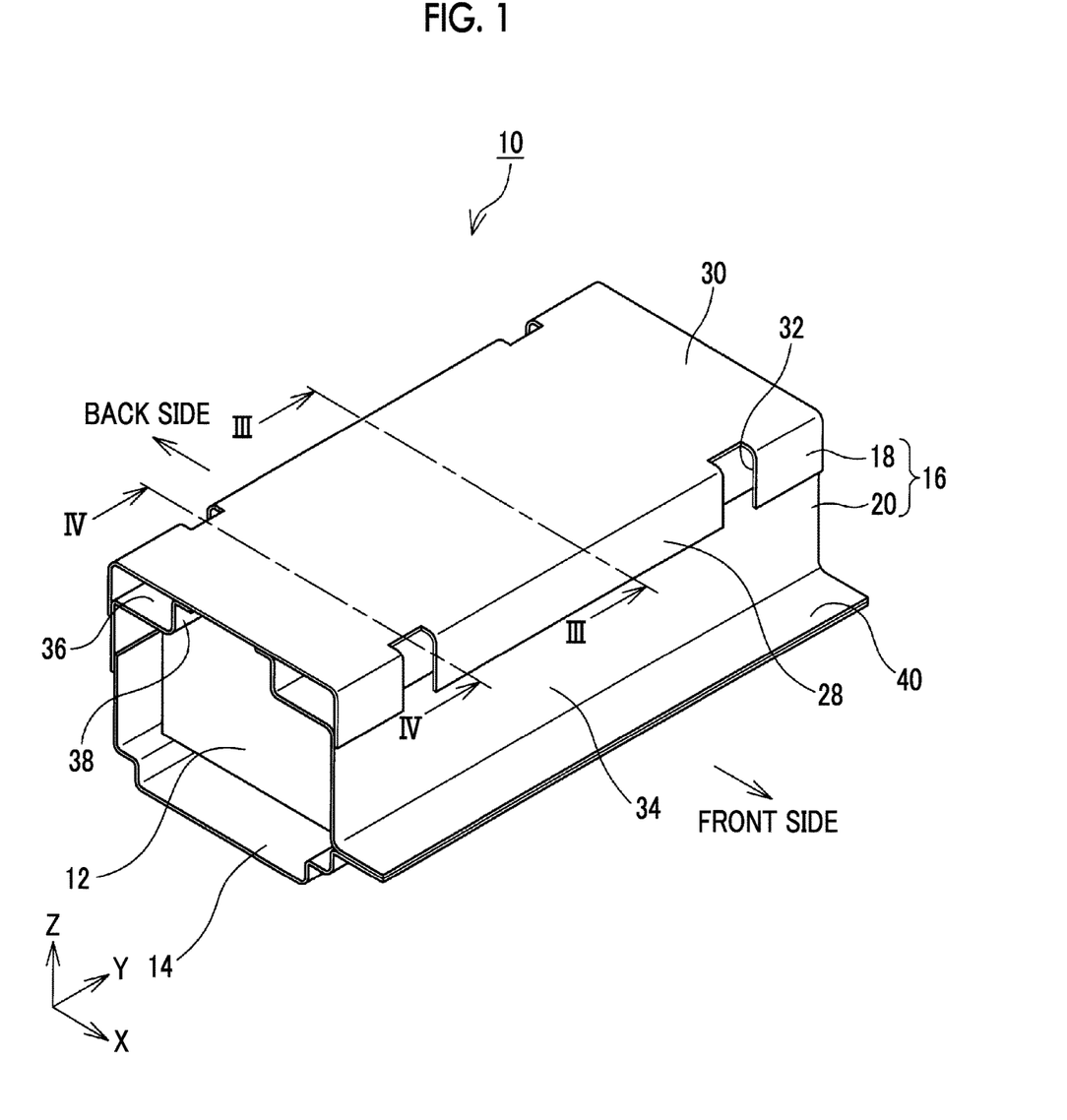
FIG. 1 is a schematic perspective view of a battery pack of an embodiment.
Figure 2:
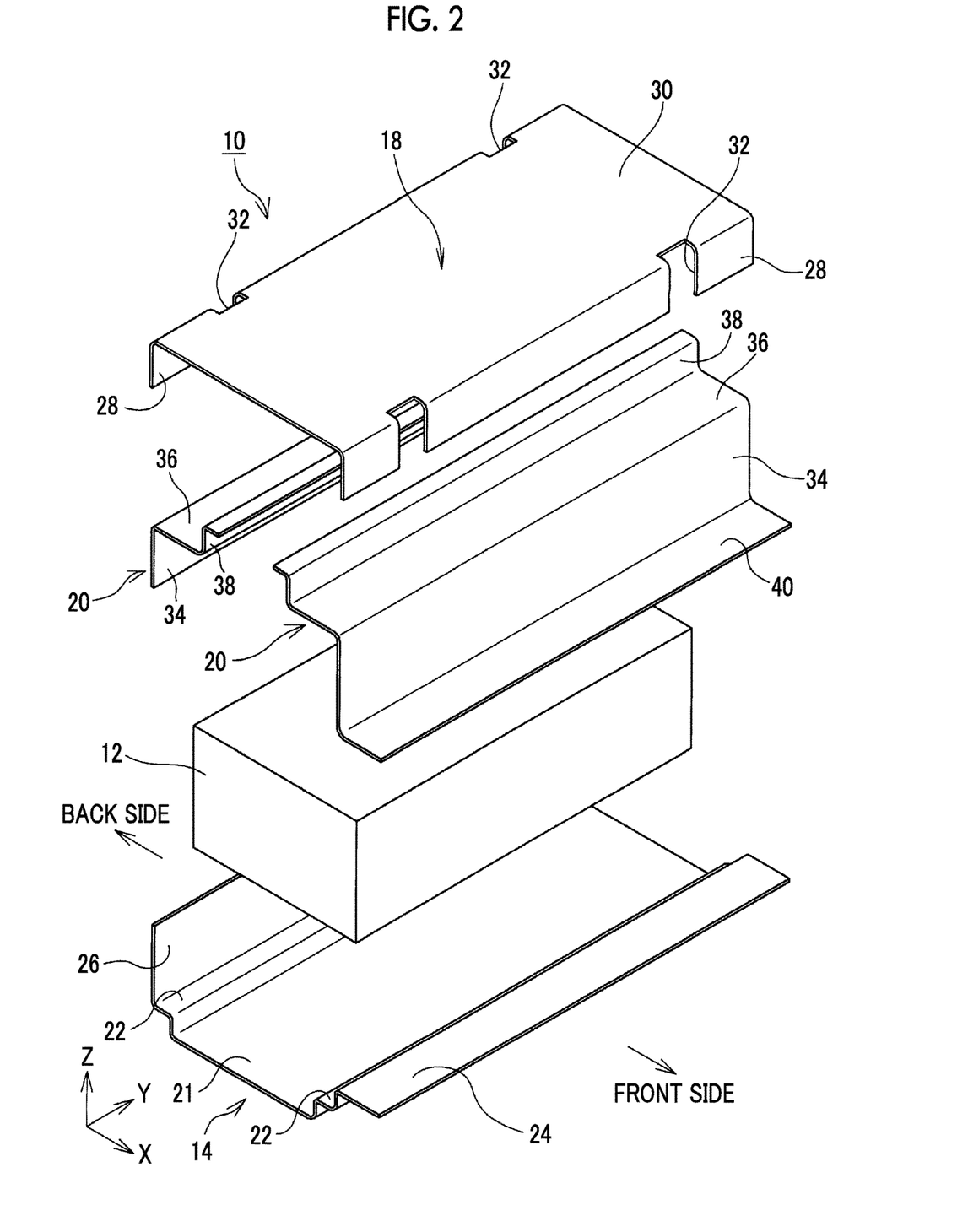
FIG. 2 is an exploded perspective view of the battery pack.
Figure 3:
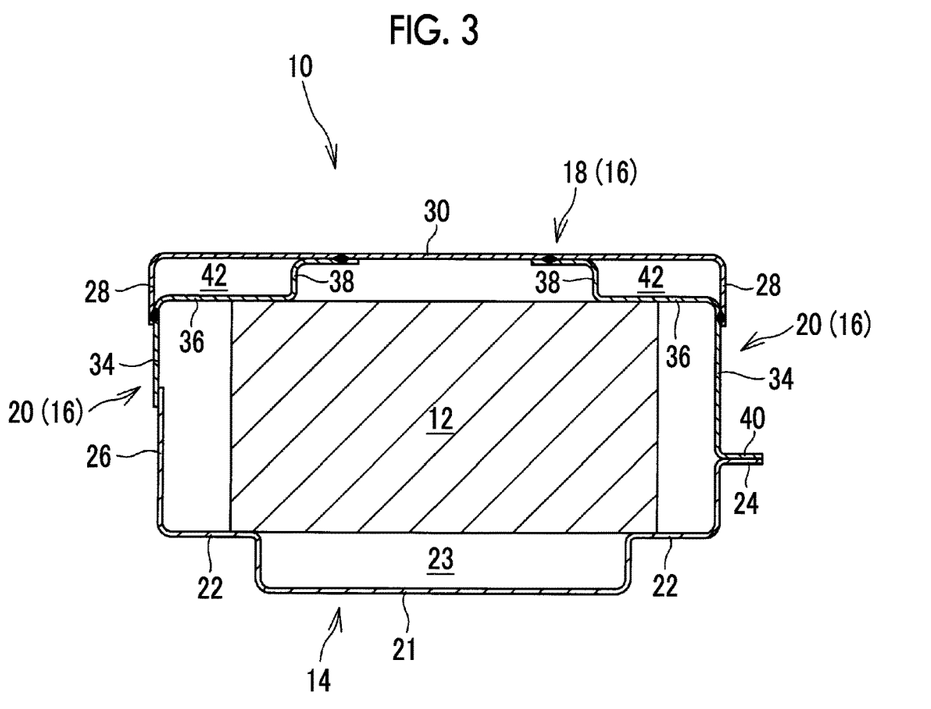
FIG. 3 is a sectional view taken along line III-III of FIG. 1.
Figure 4:
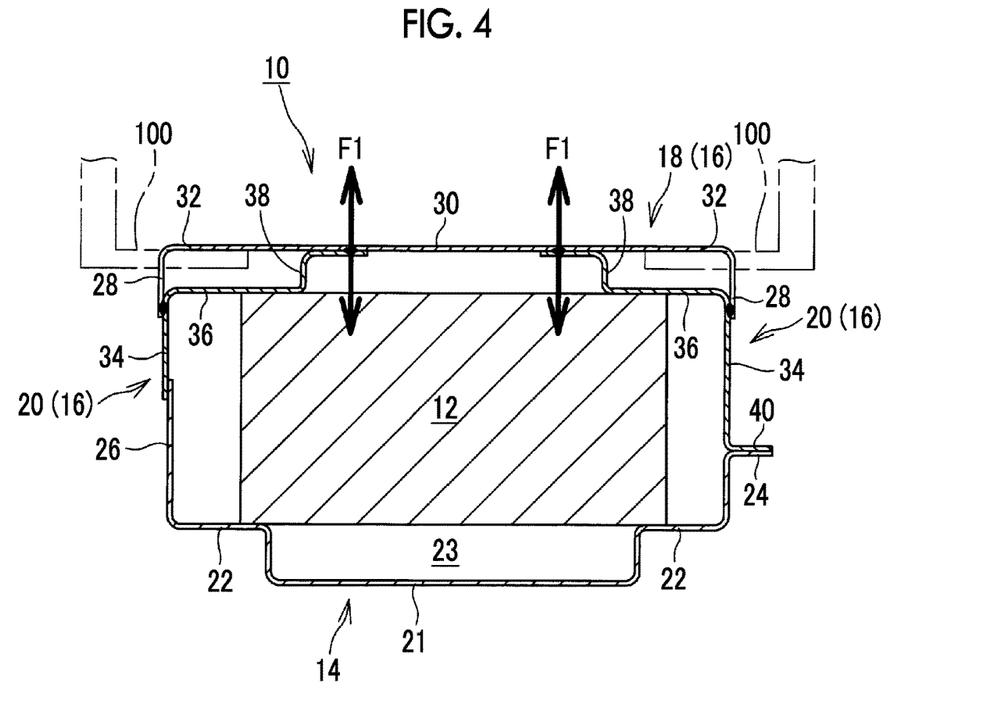
FIG. 4 is a sectional view taken along line IV-IV of FIG. 1.

Hereinafter, a battery pack 10 of an embodiment will be described referring to the drawings. FIG. 1 is a schematic perspective view of the battery pack 10, and FIG. 2 is an exploded perspective view of the battery pack 10. FIG. 3 is a sectional view taken along line III-III of FIG. 1, and FIG. 4 is a sectional view taken along line IV-IV of FIG. 1. In FIGS. 1 to 4, for ease of understanding, the dimension of each member is changed from the actual dimension, and the shape of each member is simplified compared to the actual shape.

The battery pack 10 is an in-vehicle battery pack that is mounted in an electrically powered vehicle, for example, a hybrid vehicle, an electric vehicle, or the like. The battery pack 10 includes a battery unit 12, and a battery case that houses the battery unit 12. In FIG. 1, both ends of the battery case in a depth direction (Y direction) are opened, and the openings are covered with a front cover and a back cover (both are not shown). A supply duct that supplies refrigerant to the battery unit 12, an exhaust duct that discharges the refrigerant to the outside, and the like are connected to the front cover and the back cover.

The battery unit 12 stores electric power that is supplied to a motor for traveling, and has a plurality of single cells and accessories mechanically or electrically coupled in a unit. Each single cell is a rechargeable secondary battery, and is, for example, a lithium-ion battery, a nickel-hydrogen battery, or the like. The accessories include a bus bar or a harness that electrically connects the single cells, a coupling member that mechanically couples the single cells, sensors that detect a voltage, a temperature, and the like of each single cell, a relay that relays the single cells and external equipment, a resin frame or a holder that holds the single cells, and the like. The shape of the battery unit 12 constituted of the single cells and the accessories is not particularly limited, and in the embodiment, is substantially a rectangular parallelepiped shape elongated in the depth direction (Y direction).

The battery unit 12 is housed in the battery case. The battery case includes a lower case 14 in which the battery unit 12 is placed, an upper cover 16 that covers an upper end opening of the lower case 14, and the front cover and the back cover that cover both ends in the depth direction (Y direction). The upper cover 16 includes an upper frame 18 and side frames 20. The side frames 20 and the upper frame 18 are prepared separately from one another and are bonded together. The lower case 14, the upper cover 16, the front cover, and the back cover are all formed by sheeting and molding a metal plate made of, for example, a metal, such as aluminum.

The lower case 14 is a member in which the battery unit 12 is placed and an upper end thereof is opened. Specifically, the lower case 14 has a substantially U-shaped section with both ends in a width direction (X direction) rising in a stepwise manner. However, the stepwise rising portion formed at the first end in the width direction is lower than the stepwise rising portion formed at the second end in the width direction. Hereinafter, the first end in the width direction is referred to as a "front side", and the second end in the width direction is referred to as a "back side". The battery unit 12 is assembled inside the lower case 14. The assembling work is performed in a state in which the front side of the lower case 14 faces the front and the back side thereof faces the back. In order to prevent the assembling work from being obstructed, the rising portion on the front side of the lower case 14 is lower than the rising portion on the back side.

As will be apparent from FIG. 2, the rising portion on the front side has a first step surface 22 and a second step surface 24. The rising portion on the back side has a first step surface 22, and a backwall 26 that stands vertically from the step surface 22. The battery unit 12 is placed on the first step surface 22. Accordingly, as shown in FIGS. 3 and 4, a space 23 is formed between a lower end of the battery unit 12 and a bottom portion 21 of the lower case 14. The space 23 functions as a flow passage through which a fluid, for example, refrigerant cooling the battery unit 12, smoke exhaust discharged from the battery unit 12, or the like flows. A part of the upper cover 16 described below overlaps the second step surface 24 formed on the front side and the backwall 26 formed on the back side. Then, the lower case 14 and the upper cover 16 are screwed and fastened in the overlapped state.

The upper cover 16 is a member that covers the upper end opening of the lower case 14, and is constituted by bonding a pair of side frames 20 to one upper frame 18. The upper frame 18 has a substantially U-shaped section including an upper surface portion 30 that covers an upper surface of the battery unit 12, and a pair of trailing portions 28 that extend downward from both ends in a width direction of the upper surface portion 30. Two access openings 32 are formed in each trailing portion 28 at an interval in the depth direction. In the embodiment, the access openings 32 are notched portions that are notched in a substantially rectangular shape from a lower end of the trailing portion 28 to the middle of the upper surface portion 30.

Each of the side frames 20 includes a side surface portion 34 that covers the side surface of the battery unit 12, an intermediate portion 36 that extends from an upper end of the side surface portion 34 inward in the width direction, and a contact portion 38 that extends upward from an end portion of the intermediate portion 36. The upper end of the side surface portion 34 is higher than the lower end of the trailing portion 28. In other words, the vicinity of the upper end of the side surface portion 34 overlaps the trailing portion 28 in an up-down direction. Then, in a case of attaching the upper cover 16 to the lower case 14, an outer surface of the side surface portion 34 is brought into contact with an inner surface of the trailing portion 28.

The lower end of the side surface portion 34 is screwed and fastened to the lower case 14. Specifically, the lower end of the side surface portion 34 on the front side is bent outward in the width direction and overlaps the step surface 24 of the lower case 14. The lower end of the side surface portion 34 on the back side extends to a height position overlapping the backwall 26 of the lower case 14 and overlaps outward in the width direction of the backwall 26. The lower case 14 and the side frames 20 are screwed and fastened in the overlapped location.

The intermediate portion 36 extends from the upper end of the side surface portion 34 inward in the width direction so as to pass below the upper surface portion 30 and faces the upper surface portion 30 in the up-down direction. In other words, a space 42 is formed between the upper surface portion 30 and the intermediate portion 36. The access openings 32 permit access to the space 42 from the outside. The intermediate portion 36 is brought into contact with an upper end surface of the battery unit 12. In other words, the battery unit 12 is brought into a state of being sandwiched vertically between the step surface 22 of the lower case 14 and the intermediate portion 36 of the upper cover 16.

The contact portion 38 that rises upward and is then bent inward in the width direction, and has a substantially L-shaped section extends from an inward end portion in the width direction of the intermediate portion 36. The upper end of the contact portion 38 is brought into contact with the upper surface portion 30.

The upper frame 18 and the side frames 20 are bonded to each other by welding and integrated. In FIGS. 3 and 4, a black ellipse indicates a welding location. As will be apparent from FIGS. 3 and 4, in the embodiment, a contact portion of the upper surface portion 30 and the contact portion 38, and a contact portion of the vicinity of the lower end of the trailing portion 28 and the side surface portion 34 are bonded to each other by welding.

In a case of assembling the battery pack 10, the battery unit 12 is assembled inside the lower case 14. In order to facilitate the assembling work of the battery unit 12, the height on the front side of the lower case 14 is lower than the height on the back side. In a case where the battery unit 12 is assembled, subsequently, the upper cover 16 is attached to an upper side of the lower case 14. Next, the front cover and the back cover are attached to the front side and the back side of the lower case 14, and in a case where various ducts and the like are attached to the covers, the battery pack 10 is completed. In a case where the battery pack 10 is assembled, the battery pack 10 is transported to a desired position by the transport device. The transport device is provided with holding hooks 100 (see FIG. 4). The transport device moves up the holding hooks 100 in a state of being engaged with the upper surface portion 30 with the holding hooks 100 inserted into the access openings 32, thereby suspending and holding the battery pack 10.

Figure 7:
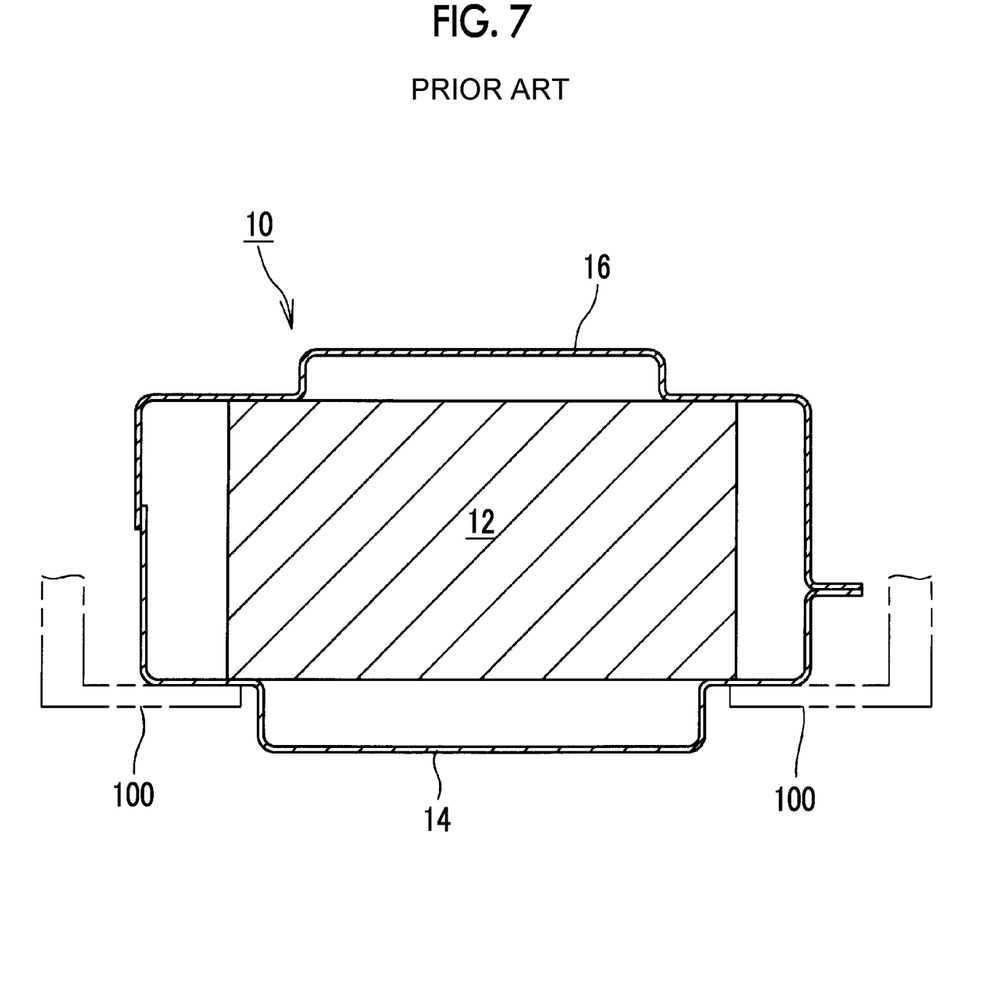
FIG. 7 is a diagram showing an example of a battery pack of the related art.

As will be apparent from the above description, in the embodiment, the upper cover 16 is constituted of the upper frame 18 and the side frames 20 that are bonded together, and the access openings 32 are provided in a part of the upper frame 18. In other words, the upper end and both end portions in the width direction of the upper cover 16 are formed in a double structure in which there are spaces 42 between an outer surface and an inner surface, and the access openings 32 that are accessible from the outside are provided in the spaces 42. A reason for such a configuration will be described in comparison with the related art. FIG. 7 is a sectional view of a battery pack 10 of the related art.

As shown in FIG. 7, an upper cover 16 of the battery pack 10 of the related art is constituted of a single member having a substantially U-shaped section. No openings that can become holding portions are provided in the side surfaces of the upper cover 16. For this reason, in a case of suspending and holding the battery pack 10 with the holding hooks 100 of the transport device, the holding hooks 100 need to be engaged with the bottom portion of the battery pack 10 and the bottom portion needs to be suspended and held. However, in a case where the bottom portion of the battery pack 10 is suspended and held, since the center of gravity of the battery pack 10 becomes higher than the holding portions, the posture of the battery pack 10 being transported is hardly stable, and transportability is bad.

Figure 8:
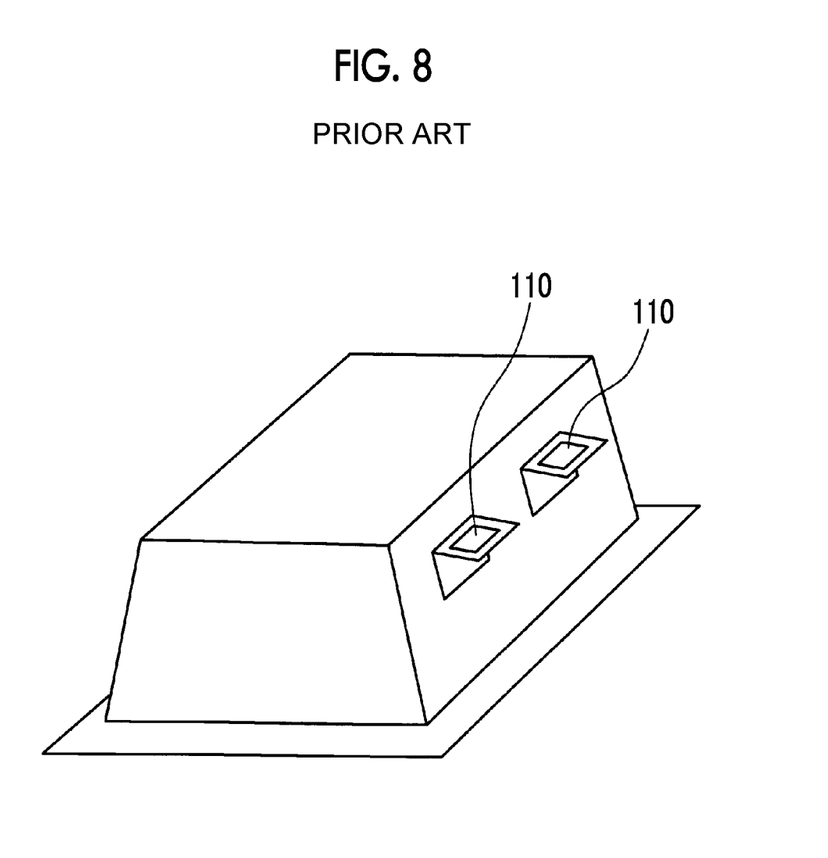
FIG. 8 is a diagram showing an example of a battery case of the related art.

JP 2014-013661 A discloses that handles 110 projecting outward are provided in the side surfaces of the battery case as shown in FIG. 8. In a case where such handles 110 are provided in the vicinity of the upper end of the battery case, since the center of gravity of the battery pack becomes higher than the holding portions (the portions of the handles 110), stability is improved. However, as shown in FIG. 8, in a case where the handles 110 projecting outward are provided, the size of the entire battery pack increases. In the vehicle, since a mounting space is limited, an increase in size of the in-vehicle battery pack 10 causes a serious problem.

In the embodiment, in order to facilitate transport and to suppress an increase in size, a part of the upper cover 16 is formed in a double structure in which there are the spaces 42 between the inner surface and the outer surface, and the access openings 32 that are accessible to the spaces 42 are provided. In the above-described case, as shown in FIG. 4, it is possible to insert the holding hooks 100 into the spaces 42 through the access openings 32, and consequently, to engage the holding hooks 100 with the upper surface portion 30. In a case where the holding hooks 100 are engaged with the upper surface portion 30, since the center of gravity of the battery pack 10 becomes lower than the holding portions, it is possible to stably transport the battery pack 10. In particular, in the embodiment, the four access openings 32 in total with the two access openings in each of the trailing portions 28 facing each other are provided. As described above, in a case where the access openings 32 are distributed and provided at four locations, since the holding positions for holding the battery pack 10 are distributed evenly, it is possible to more stably transport the battery pack. The positions or the number of access openings 32 may be suitably changed according to the mass, shape, the position of the center of gravity, or the like of the battery pack 10.

According to the embodiment, it is understood that the width of the upper cover 16 is substantially equal to the width of the lower case 14, and the size is hardly increased compared to the related art (FIG. 7). As a result, it is possible to facilitate transport and to suppress an increase in size.

Since the upper cover 16 has a double structure, even if the access openings 32 are included in the trailing portions 28, an internal space and an external space of the battery case do not communicate with each other. As a result, a foreign substance or water that enters the spaces 42 through the access openings 32 is prevented from reaching the inside of the battery case. With this, the battery unit 12 is appropriately protected. In particular, in the embodiment, as described above, since the contact portion 38 and the upper surface portion 30 are bonded to each other by welding, entrance of a foreign substance or the like from the gap between the contact portion 38 and the upper surface portion 30 into the pack is effectively prevented.

In a case where the holding hooks 100 are hooked on the upper surface portion 30 to suspend and hold the battery pack 10, force F1 is applied to the bonded portion of the upper surface portion 30 and the contact portion 38 in a direction of separating the upper surface portion 30 and the contact portion 38 from each other. In order to prevent bonding of the upper surface portion 30 and the contact portion 38 from being released by the force F1, in the embodiment, the trailing portion 28 and the side surface portion 34 are bonded to each other by welding. The trailing portion 28 and the side surface portion 34 are bonded to each other, part of the force F1 that is applied to the upper surface portion 30 and the contact portion 38 is distributed to the bonded portion of the trailing portion 28 and the side surface portion 34. With this, separation of the upper surface portion 30 and the contact portion 38 is effectively prevented. When the upper surface portion 30 and the contact portion 38 are firmly bonded to each other, bonding of the trailing portion 28 and the side surface portion 34 may be omitted.

Figure 5:
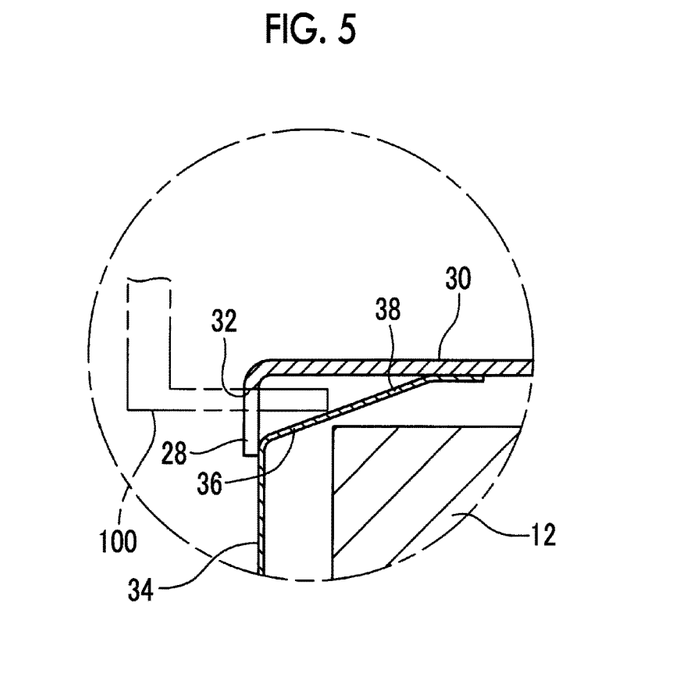
FIG. 5 is a diagram showing an example of another battery pack.

In any cases, according to the embodiment, it is possible to improve transportability while suppressing an increase in size of the battery pack 10. The above-described configuration is an example, and as long as the upper cover 16 includes the upper frame 18 and the side frames 20 that are connected together and the access openings 32 are included in a part of the upper frame 18, other configurations may be suitably changed. For example, in the embodiment, while the plate thickness of the upper frame 18 and the plate thickness of each of the side frames 20 are equal to each other, the plate thickness of the upper frame 18 and the plate thickness of each of the side frames 20 may be different from each other. For example, there is a case where a withstanding load requested for the upper surface portion of the battery pack 10 is greater than a withstanding load requested for the side surface portion against treading or the like. In the above-described case, as shown in FIG. 5, the plate thickness of the upper frame 18 may be greater than the plate thickness of each of the side frames 20. With such a configuration, it is possible to further reduce the materials for the entire battery case while securing the withstanding load of the upper surface portion of the battery pack 10, compared to a case where the plate thickness of each of the side frames 20 and the plate thickness of the upper frame 18 are equal to each other. Consequently, it is possible to further reduce the weight or cost of the battery pack 10.

Figure 6:
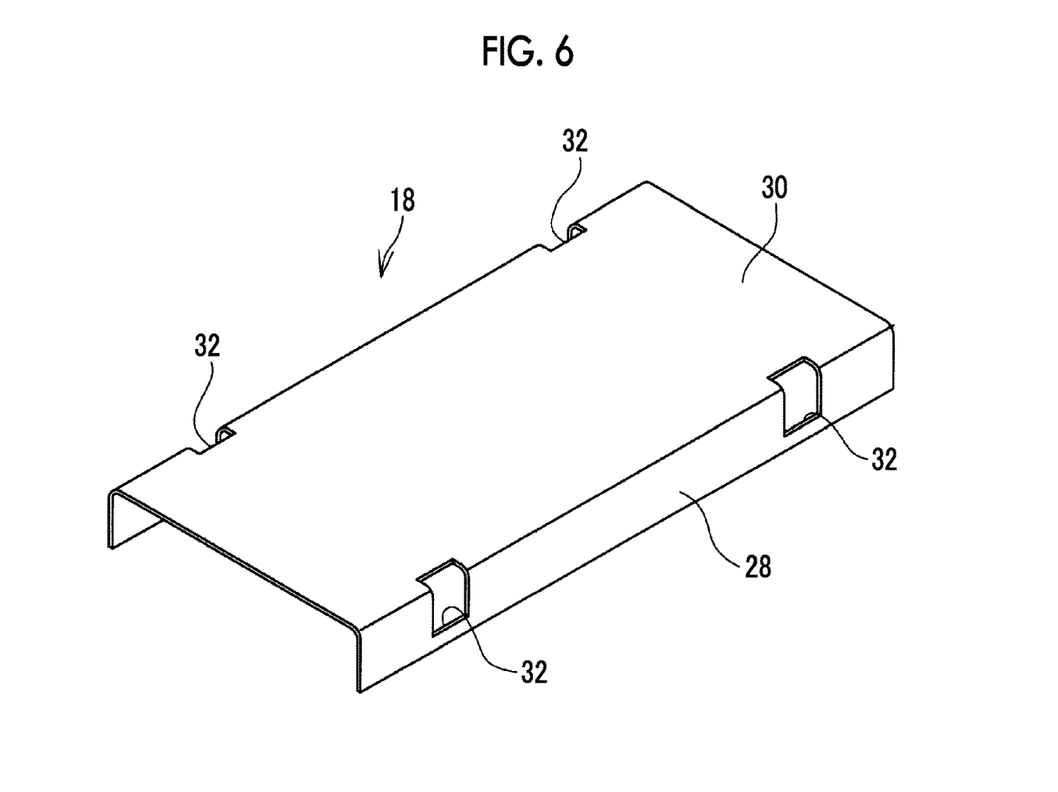
FIG. 6 is a diagram showing an example of another upper frame.

The access openings 32 may be suitably changed as long as the access openings are formed in the trailing portions 28 and are of such a size that at least the holding hooks 100 can be inserted and detached. For example, as shown in FIG. 5, the access openings 32 may be of a size not reaching the upper surface portion 30. However, in the above-described case, since the contact area of the holding hooks 100 and the upper frame 18 becomes small, it is desirable that the access openings 32 extend to the middle of the upper surface portion 30. As shown in FIG. 6, the access openings 32 are not limited to notched portions, and may be through-holes formed in the trailing portions 28.

As long as the spaces 42 can be formed between the intermediate portion 36 and the upper surface portion 30, and the contact portion 38 can be brought into contact with the upper surface portion 30, the shapes of the intermediate portion 36 and the contact portion 38 may be suitably changed. For example, as shown in FIG. 5, the intermediate portion 36 and the contact portion 38 may be inclined surfaces that extend from the upper end of the side surface portion 34 obliquely upward.

What is claimed is:

1. A battery pack configured to be mounted in a vehicle, the battery pack comprising:
   a battery unit; and
   a battery case that houses the battery unit, wherein
   the battery case includes side frames and an upper frame,
   the upper frame includes an upper surface portion that covers an upper surface of the battery unit and a trailing portion that extends downward from an end portion in a width direction of the upper surface portion,
   each of the side frames includes a side surface portion that covers a side surface of the battery unit, an intermediate portion that extends from an upper end of the side surface portion inward in the width direction so as to pass below the upper surface portion and faces the upper surface portion in an up-down direction, and a contact portion that extends upward from an end portion of the intermediate portion and is brought into contact with the upper surface portion, and
   the trailing portion includes one or more access openings that are accessible to a space between the upper surface portion and the intermediate portion facing each other in the up-down direction.

2. The battery pack according to claim 1, wherein the access opening is a notched portion that is notched from a lower end of the trailing portion to a middle of the upper surface portion.

3. The battery pack according to claim 1, wherein:
   the upper frame has a pair of trailing portions that extend downward from both ends in the width direction of the upper surface portion and face each other in the width direction, and the side frames are disposed on both sides in a width direction of the battery unit; and
   each trailing portion includes two access openings.

4. The battery pack according to claim 1, wherein:
   a vicinity of a lower end of the trailing portion is brought into contact with a vicinity of an upper end of the side surface portion;
   the upper surface portion of the upper frame and the contact portion of each of the side frames are bonded together; and
   the trailing portion of the upper frame and the side surface portion of each of the side frames are bonded together.

5. The battery pack according to claim 1, wherein a plate thickness of each of the side frames and a plate thickness of the upper frame are different from each other.

6. The battery pack according to claim 1, wherein the side frames and the upper frame are prepared separately from one another and are bonded together.

\* \* \* \* \*